3,073,736
METHOD OF BONDING PLASTIC SHEETS
Ferdinand Lange, Minden, Westphalia, Germany, assignor to Frau Dr. Wilma Wendt, geb. Oellrich, Hamburg, Germany
No Drawing. Filed Oct. 31, 1955, Ser. No. 544,057
Claims priority, application Germany Oct. 30, 1954
10 Claims. (Cl. 156—307)

The present invention relates to a method of bonding to each other surface portions of plastic materials, and more particularly it relates to a method of bonding to each other plastic surface portions of sheet materials or foils.

For many purposes, but especially for the wrapping of foodstuffs such as chocolates, butter and cheese, or for wrapping food that is to be preserved by deep freezing methods, to name only a few eamples, it is required to bond overlapping portions of the wrapping sheets or foils together so as to obtain a completely sealed package. The foils or sheets of wrapping material customarily consist of synthetic plastic materials such as sheets of polyvinyl resins or cellulose esters, or they consist of metal or paper foils which are coated with a synthetic plastic material. In either case the bond has to be accomplished between two surface portions consisting of synthetic plastic material.

The customary methods of bonding synthetic plastic materials have many disadvantages when foodstuffs are to be enclosed by the bonded sheets. Customarily employed solvents for plastic materials frequently impart an undesirable odor to the packaged goods, and in many cases are deleterious to health and therefore must not be use in connection with food. Furthermore, solvents having a relatively low boiling point such as methanol or ethanol will evaporate too quickly for satisfactory completion of the bonding operation. Attempts to overcome the above-mentioned disadvantages by using thermoplastic sheets, or foils coated with a thermoplastic material, and bonding the wrapping material by application of heat and pressure, require expensive bonding machinery and furthermore, impart heat to the wrapped goods which in many cases is deleterious or at least undesirable. It has also been attempted to avoid any kind of bonding of the wrapping material by a complicated arrangement of folds which is supposed to more or less completely seal the contents of the package. This latter method does not achieve complete sealing, requires additional quantities of wrapping material and also rather complicated folding machinery.

It is therefore an object of the present invention to overcome the aforementioned disadvantages in the sealing of wrappers and especially the sealing of food wrapping materials.

It is another object of the present invention to provide a method of bonding plastic surface portions of sheet materials to each other which can be easily and economically executed.

It is a further object of the present invention to provide a method of bonding plastic surface portions of sheet materials which does not employ any materials deleterious to health or otherwise incompatible with the goods wrapped in the sheet material.

Other objects and advantages of the present invention will become apparent from a further reading of the description and the appended claims.

With the above objects in view, the present invention mainly consists in a method of bonding to each other surface portions of a plastic material adapted to become actively adhesive by application of a softener thereto, comprising the steps of applying to at least one of the flat surface portions a softener adapted to soften the portion and essentially consisting of an ester of a polyvalent alcohol with a low molecular weight aliphatic monovalent carboxylic acid, and pressing the flat surface portions against each other, whereby the portions are bonded to each other.

According to the present invention it is possible to bond to each other sheets or foils of plastic material or sheets or foils coated with a plastic material without the application of heat and without in any way effecting the goods wrapped in the sheet.

The present invention provides for applying, for instance by brushing or by means of a coating roller or a sponge, to the surface portions which are to be bonded together, or at least to one of the surface portions, an ester of a polyvalent alcohol, preferably containing two or three alcoholic OH groups, with a low molecular aliphatic carboxylic acid, and for subsequently pressing together of the two surface portions. Only limited pressure is required for firm bonding of the two surface portions while the above-described esters soften and adhesively activate the plastic material.

The esters which are used as softeners according to the present invention have a relatively high boiling point so that the plastic surface portions to which the esters have been applied remain actively adhesive for a considerable length of time. Therefore, the danger of insufficient bonding due to evaporation of the ester prior to completion of the bonding process is avoided. These esters are also free of any toxic effect or odor which could be imparted to the wrapped goods. In preferred embodiments of the present invention glycerol triacetate or glycerol diacetate are used for bonding portions of wrapping material consisting of, or coated with polyvinyl resins, mixed polymerisates of polyvinyl resins or cellulose esters.

It has been found that good results are obtained with esters of glycerol and low molecular weight aliphatic carboxylic acids and with esters of acetic acid and polyvalent alcohols. Forming esters of glycerol and acetic acid results in glycerol triacetate or glycerol diacetate which have previously been referred to as being used in preferred embodiments of the execution of the method of the present invention.

These esters according to the present invention may be applied to the plastic surface portion of the wrapping material prior to the wrapping of goods therein or after the wrapping of the same. It has been found advantageous to allow a time lapse of about 3 to 15 seconds between the application of the softener and the pressing together of the sheet surface portions.

While the bonding according to the present invention can be effected without application of heat, it is also within the scope of the present invention to apply heat together with pressure in cases where the wrapped goods are not affected by heat and where for instance an especially quick completion of the bonding process is required.

Depending on the specific conditions under which the bonding process is to be executed, such as the minimum and maximum length of time required for completing the bonding, the interaction between a specific ester and the specific plastic material of the sheet or the coating, it is sometimes desirable and is within the scope of the present invention to dilute the ester with a solvent in which the same is soluble and in which the plastic sheet or coating is insoluble. Ethanol and methanol have been found to give excellent results when used as solvents for diluting the ester.

Depending on specific conditions, the ester such as glycerol triacetate or glycerol diacetate may be diluted with varying quantities of methanol or ethanol up to a maximum dilution of one part by volume of softener in about 7 parts by volume of solvent. It is to be noted however that in cases where the ester is diluted with a solvent, the solvent for the ester must be so chosen as to have a relatively low boiling point and to be incapable of dissolving the plastic material of the sheet. Upon application of the diluted ester it is then necessary to wait prior to pressing the surface portions together until substantially all of the solvent has evaporated.

The sheets of foil of plastic material or the plastic coating of wrapping foils may consist in accordance with the present invention of any plastic material adapted to be softened and to become actively adhesive by the application of an ester of a polyvalent alcohol with a low molecular weight aliphatic monovalent carboxylic acid, as disclosed in the present invention. Especially advantageous results have been obtained by using in combination with such esters a plastic sheet or coating consisting of cellulose esters, polyvinyl resins, mixed polymerisates of polyvinyl resins or a combination of these. It is also within the scope of the present invention to have included in the plastic sheet or coating a plasticizer such as dioctyl phthalate or the like.

The following examples are given as illustrative only, the scope of the present invention however not being limited to the specific details of the examples.

*Example 1*

A food package is to be wrapped into an aluminum sheet coated on both sides with a thin layer of nitro-cellulose. Approximately 3 grams of nitro-cellulose are used for coating 1 square meter of aluminum foil. Immediately prior to the wrapping of the food package, glycerol triacetate is applied by means of a coating roller to one of the two surface portions which are to be bonded together. The coating roller is covered with felt which is kept soaked with glycerol triacetate. The wrapping of the package is then completed with sufficient speed so that approximately 6 seconds after one of the bonding portions has been in contact with the coating roller, this portion is brought in contact and pressed together with the corresponding glycerol triacetate-free bonding portion. The limited pressure required may be supplied by hand or with a suitable pressing device. The bonding takes place at room temperature.

During the approximately 6 seconds which lapse between application of the glycerol triacetate and the pressing together of the bonding portions, the glycerol triacetate has caused a sufficient softening of the nitro-cellulose coating so that upon pressing together of the bonding sheet portions the same immediately adhere firmly to each other. The food package which is now firmly sealed into the nitro-cellulose coated aluminum foil sheet may now immediately be further handled in any desired way.

*Example 2*

A laminated foil consisting of a paper sheet having on one side an aluminum foil and on its other side a thin coating of nitro-cellulose (about 2 grams of nitro-cellulose per square meter of sheet) is used for wrapping a package. A small quantity of diluted glycerol triacetate is applied by means of a cotton swab to both of the two portions of the nitro-cellulose coating which are to be bonded together. The diluted glycerol triacetate is prepared by dissolving one part by volume of glycerol triacetate in 4 parts by volume of 96% ethanol. A time lapse of approximately 10 seconds is provided between application of the diluted glycerol triacetate and pressing together of the two bonding portions. During this period substantially all of the ethanol has evaporated and the nitro-cellulose coating of the bonding portions has been softened and made actively adhesive by the glycerol triacetate. The superimposed bonding portions are pressed together as described in Example 1.

*Example 3*

To the two bonding portions of a wrapping sheet consisting of an aluminum foil coated with a mixture of 60 parts polyvinyl chloride, 40 parts polyvinyl acetate, 8 parts nitro-cellulose and 12 parts dioctyl phthalate, is applied, in the manner described in Example 1, a solution of glycerol diacetate in methanol containing one part by volume of glycerol diacetate in 6 parts by volume of methanol, thereby swelling and adhesive activation of the surface of the plastic film is caused. Both of the sheet portions which are to be bonded together are treated with the solution of glycerol diacetate in methanol. The thus treated sheets are allowed to stand for about 3 minutes during which time substantially all of the methanol has evaporated. Subsequently the treated bonding portions of the sheet are pressed against each other with clamps which are heated to 50° C. A firm bond is thus immediately established.

*Example 4*

A polyvinyl sheet having a thickness of 0.03 mm. and consisting of 60 parts polyvinyl chloride, 40 parts polyvinyl acetate, and 15 parts dioctyl phthalate, is used as wrapping material in a manner similar to the one described in Example 2, and equally good results with respect to immediate complete sealing are obtained.

*Example 5*

An aluminum foil as desribed in Example 1 and a paper sheet which is impregnated with the mixed polymerisate described in Example 3 are teated with glycerol triacetate over an entire surface respectively in the manner described in Example 2. The treated surfaces of both sheets are thereby caused to swell. Subsequently the two sheets are superimposed upon each other with the treated surfaces in contact with each other, and are pressed together at room tempertaure. In this manner a laminated water-tight paper sheet having an aluminum lining on one side is obtained.

In this connection it should be noted that it was impossible to obtain such laminated sheets with water-soluble adhesives, since the water portion of such adhesives was unable to escape through the water-tight paper and by application of heat for removal of the water the plastic-treated paper invariably sticks to the heat conveying rollers.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. In a method of packaging foodstuffs sensitive to solvent vapors in plastic sheet wrapping material essentially consisting of at least one compound selected from the group consisting of cellulose esters, polyvinyl resins and mixed polymerisates of polyvinyl resins and adapted to be made adhesive by application thereto of a softener, the sealing of said package, comprising the steps of coating at least one surface portion of said plastic sheet wrapping material with a softener adapted to make said plastic surface portion adhesive, said softener consisting essentially of a member of the group consisting of glycerol triacetate and glycerol diacetate, said softener prior to application thereof being diluted with a solvent belonging to the group consisting of methanol and ethanol; allowing said surface portion with said diluted predetermined softener applied thereto stand until said solvent has substantially evaporated so as to form an adhesive surface portion consisting essentially of said compound and said softener and being free of said solvent; and thereafter pressing the thus formed adhesive surface portion against another surface portion of said sheet wrapping material whereby said surface portions are bonded to each other without forming solvent vapors.

2. In a method of packaging a material sensitive to solvent vapors in a plastic sheet wrapping material adapted to be made adhesive by application of a softener thereto, the sealing of said package, comprising the steps of coating at least one surface portion of said plastic sheet wrapping material with a softener consisting essentially of an ester of a polyvalent alcohol with a low molecular weight aliphatic monovalent carboxylic acid and being free of low boiling solvent, so as to make said one surface portion adhesive; and thereafter pressing said one surface portion against another surface portion of said sheet wrapping material whereby said surface portions are bonded to each other without forming solvent vapors.

3. In a method of packaging a material sensitive to solvent vapors in a plastic sheet wrapping material adapted to be made adhesive by application of a softener thereto, the sealing of said package, comprising the steps of coating at least one surface portion of said plastic sheet wrapping material with a softener consisting essentially of an ester of glycerine and being free of low boiling solvent, so as to make said one surface portion adhesive; and thereafter pressing said one surface portion against another surface portion of said sheet wrapping material whereby said surface portions are bonded to each other without forming solvent vapors.

4. In a method of packaging a material sensitive to solvent vapors in plastic sheet wrapping material adapted to be made adhesive by application of a softener thereto, the sealing of said package, comprising the steps of coating at least one surface portion of said plastic sheet wrapping material with a softener consisting essentially of an ester of a polyvalent alcohol with a low molecular weight saturated fatty acid and being free of low boiling solvent, so as to make said one surface portion adhesive; and thereafter pressing said one surface portion against another surface portion of said sheet wrapping material, whereby said surface portions are bonded to each other without forming solvent vapors.

5. In a method of packaging foodstuffs sensitive to solvent vapors in plastic sheet wrapping material adapted to be made adhesive by application of a softener thereto, the sealing of said package, comprising the steps of coating at least one surface portion of said plastic sheet wrapping material with a softener consisting essentially of an acetic acid ester of a polyvalent alcohol being free of low boiling solvent, so as to make said one surface portion adhesive; and thereafter pressing said one surface portion against another surface portion of said sheet wrapping material, whereby said surface portions are bonded to each other without forming solvent vapors.

6. In a method of packaging foodstuffs sensitive to solvent vapors in plastic sheet wrapping material adapted to be made adhesive by application of a softener thereto, the sealing of said package, comprising the steps of coating at least one surface portion of said plastic sheet wrapping material with a softener consisting essentially of a member of the group consisting of glycerol triacetate and glycerol diacetate and being free of low boiling solvent, so as to make said one surface portion adhesive; and thereafter pressing said one surface portion against another surface portion of said sheet wrapping material whereby said surface portions are bonded to each other without forming solvent vapors.

7. In a method of packaging a material sensitive to solvent vapors in plastic sheet wrapping material to form a bonded sheet wrapping material adapted for use in connection with materials sensitive to odors, said sheet wrapping material being adapted to be made adhesive by application of a softener thereto, the sealing of said package, comprising the steps of coating at least one surface portion of said plastic sheet wrapping material with a softener consisting essentially of an ester of a polyvalent alcohol with a low molecular weight aliphatic monovalent carboxylic acid, said softener prior to application thereof being diluted with a solvent in which said predetermined softener is soluble and in which said plastic sheet material is insoluble, said solvent having a boiling point considerably lower than the boiling point of said softener, so as to make said surface portion adhesive; allowing said surface portion with said diluted softener applied thereto to stand until said solvent has substantially completely evaporated so as to form an adhesive surface portion consisting of said plastic sheet wrapping material being coated with and containing said predetermined softener and being free of low boiling solvent; and thereafter pressing said surface portion against another surface portion of said sheet wrapping material whereby said surface portions are bonded to each other without forming solvent vapors.

8. In a method of packaging foodstuffs sensitive to solvent vapors in plastic sheet wrapping material adapted to be made adhesive by application of a softener thereto, said sheet wrapping material essentially consisting of a member of the group consisting of cellulose esters, polyvinyl resins and mixed polymerisates of polyvinyl resins, the sealing of said package, comprising the steps of coating at least one surface portion of said plastic sheet wrapping material with a softener which consists essentially of a member of the group consisting of glycerol triacetate and glycerol diacetate and being free of low boiling solvent, so as to make said one surface portion adhesive; and thereafter pressing said one surface portion against another surface portion of said sheet wrapping material, whereby said surface portions are bonded to each other without forming solvent vapors.

9. In a method of packaging a material sensitive to solvent vapors in plastic sheet wrapping material adapted to be made adhesive by application thereto of a softener, the sealing of said package, comprising the steps of coating two surface portions of said wrapping material with a softener consisting of an ester of a polyvalent alcohol with a low molecular weight aliphatic monovalent carboxylic acid and being free of low boiling solvent, so as to make said two surface portions adhesive; and thereafter pressing the two thus formed adhesive surface portions against each other, whereby said portions are bonded to each other without forming solvent vapors.

10. In a method of packaging foodstuffs sensitive to solvent vapors in plastic sheet wrapping material adapted to be made adhesive by application thereto of a softener, the sealing of said package, comprising the steps of coating at least one surface portion of said plastic sheet wrapping material with a softener consisting of an ester of a polyvalent alcohol with a low molecular weight aliphatic monovalent carboxylic acid, said softener being soluble in and prior to application thereof being diluted with a low-boiling solvent belonging to the group consisting of methanol and ethanol, said solvent having a boiling point considerably lower than the boiling point of said softener; allowing said one surface portion with said diluted softener applied thereto to stand until said solvent has substantially completely evaporated so as to form an adhesive surface portion consisting of said plastic sheet wrapping material and said softener and being free of low-boiling solvent; and thereafter pressing said surface portion against another surface portion of said sheet wrapping material whereby said surface portions are bonded to each other without forming solvent vapors.

References Cited in the file of this patent

UNITED STATES PATENTS

| | | |
|---|---|---|
| 1,808,098 | Briggs et al. | June 2, 1931 |
| 2,159,926 | Berliner | May 23, 1939 |
| 2,234,236 | Edgar | Mar. 11, 1941 |
| 2,553,124 | Williams et al. | May 15, 1951 |
| 2,569,954 | Ruebensaal | Oct. 2, 1951 |
| 2,662,929 | Dague | Dec. 15, 1953 |
| 2,729,585 | Gruber et al. | Jan. 3, 1956 |
| 2,814,581 | Flynn | Nov. 26, 1957 |

OTHER REFERENCES

Handbook of Plastics, 2nd ed., by Simonds, Weith & Bigelow, published in 1949 by D. Van Nostrand Co., N.Y. 3, N.Y., pages 344–345.